(12) United States Patent
Scott et al.

(10) Patent No.: US 9,047,400 B2
(45) Date of Patent: Jun. 2, 2015

(54) DATA PROCESSOR DEVICE FOR HANDLING A WATCHPOINT AND METHOD THEREOF

(71) Applicant: Freescale Semiconductor, Inc., Austin, TX (US)

(72) Inventors: Jeffrey W. Scott, Austin, TX (US); William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/827,004

(22) Filed: Mar. 14, 2013

(65) Prior Publication Data

US 2014/0068349 A1  Mar. 6, 2014

Related U.S. Application Data

(63) Continuation-in-part of application No. 13/598,240, filed on Aug. 29, 2012.

(51) Int. Cl.
*G06F 11/00* (2006.01)
*G06F 11/34* (2006.01)

(52) U.S. Cl.
CPC .................................. *G06F 11/3495* (2013.01)

(58) Field of Classification Search
CPC .............. G06F 11/3636; G06F 11/348; G06F 11/3466; G06F 11/3476; G06F 11/3495
USPC ........................................................... 714/45
See application file for complete search history.

(56) References Cited

U.S. PATENT DOCUMENTS

| 5,809,293 | A | 9/1998 | Bridges et al. | |
|---|---|---|---|---|
| 6,094,729 | A | 7/2000 | Mann | |
| 6,142,683 | A | 11/2000 | Madduri | |
| 6,877,114 | B2 | 4/2005 | Allen et al. | |
| 6,918,065 | B1 * | 7/2005 | Edwards et al. | 714/45 |
| 7,149,926 | B2 | 12/2006 | Ahmad et al. | |
| 2002/0087949 | A1 * | 7/2002 | Golender et al. | 717/124 |
| 2003/0097615 | A1 * | 5/2003 | Corti et al. | 714/37 |
| 2008/0126877 | A1 * | 5/2008 | Alsup | 714/45 |
| 2010/0064173 | A1 | 3/2010 | Pedersen et al. | |
| 2010/0077143 | A1 * | 3/2010 | Reid et al. | 711/118 |
| 2014/0068346 | A1 | 3/2014 | Scott et al. | |

OTHER PUBLICATIONS

Non-Final Office Action mailed Mar. 27, 2014 for U.S. Appl. No. 13/598,240, 17 pages.
Final Office Action mailed Oct. 23, 2014 for U.S. Appl. No. 13/598,240, 18 pages.
Notice of Allowance mailed Feb. 17, 2015 for U.S. Appl. No. 13/598,240, 11 pages.

* cited by examiner

*Primary Examiner* — Yair Leibovich (57) ABSTRACT

During a debug mode of operation of a data processor, it is determined at the data processor that a watchpoint event has occurred, and in response, an operating condition of a trace FIFO that stores trace information not yet communicated to a debugger is changed. For example, the occurrence of a FIFO flush watchpoint results in trace information being selectively flushed from the trace FIFO based on a state of the FIFO before the trace information has been communicated to a trace analyzer.

19 Claims, 6 Drawing Sheets

DATA PROCESSOR DEVICE FOR HANDLING A WATCHPOINT AND METHOD THEREOF

CROSS-REFERENCE TO RELATED APPLICATION(S)

This application is a continuation-in-part of U.S. patent application Ser. No. 13/598,240, filed on Aug. 29, 2012, entitled "DATA PROCESSOR DEVICE FOR HANDLING A WATCHPOING AND METHOD THEREOF," naming Jeffrey W. Scott and William C. Moyer as inventors, assigned to the current assignee hereof, and which is hereby incorporated by reference.

BACKGROUND

1. Field of the Disclosure

The present disclosure relates to electronic devices, and more data processing device(s) having debug capabilities.

2. Description of the Related Art

Debug protocols, such as the IEEE standard known as IEEE ISTO5001, or the Nexus debug standard, are used to establish real-time debug support for data processing systems that can support real-time debug message generation. Such debugging standards can specify debugging processes that are used in the development of code for a data processor. One technique used in real-time debugging is the use of debug messages that include debug information that is generated by the data processing system. One type of debug information is referred to as trace information, which can include program trace information and data trace information. Program trace information can be generated during program trace messaging, which generates program trace messages that are related to address events of a data processor. Data trace information can be generated during data trace messaging, which generates data trace messages that are related to data information stored at storage locations of the data processor, such as at register locations. For example, program trace messaging can be used to store program trace information that is used during debug operations to determine which program is executed by a data processor, and data trace messaging can be used to store changes of stored data during the debug operation of the data processor.

Trace information can be stored at a First-In First-Out (FIFO) buffer of a data processing system until it is transferred to a debugger that is typically external to the data processor system. However, an issue arises when the FIFO becomes full due to the speed at which the data processor generates trace information being greater than the speed at which the data processor can communicate the debug trace information to the external debugger. In such situations, one or more trade-offs need to be made, each of which can impact the debug capabilities of the data processing system. For example, the data processor can be stalled until the FIFO is no longer full, which can alter the real-time nature of the data processing system. Alternatively, the data processing system can continue to run without storing additional trace information, which results in debug information being lost as the data processing system continues to operate in real-time.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale.

DETAILED DESCRIPTION

During a debug mode of operation of a data processor, it is determined at the data processor that a watchpoint event has occurred, and in response, an operating condition of a FIFO that stores trace information (trace FIFO) may be changed based on state of the trace FIFO. For example, the occurrence of a FIFO flush watchpoint results in trace information being flushed from the trace FIFO before it has been communicated to a trace analyzer if the trace FIFO has reached a particular fullness level as indicated by a FIFO level indicator received from the FIFO. For example, the particular fullness level (i.e. the specified fullness level) may be 50% such that occurrence of the FIFO flush watchpoint results in trace information being flushed only if the trace FIFO is at least 50% full. In this manner, occurrence of a FIFO flush watchpoint may be further qualified by a state of the FIFO before resulting in a FIFO flush. By flushing the FIFO, information stored at the FIFO prior to being flushed that has not yet been communicated external can no longer be communicated external the FIFO. This is typically accomplished by invalidating information that has not yet been communicated external the FIFO, wherein information can be invalidated by changing pointers that correspond to the head and tail locations of the FIFO, changing the actual data stored at the FIFO, and the like. It will be appreciated, however, that the manner that a FIFO is flushed can depend upon a particular implementation of the FIFO. Various aspects of the present disclosure will be better understood with reference to FIGS. 1-8 discussed below.

Figure 1:
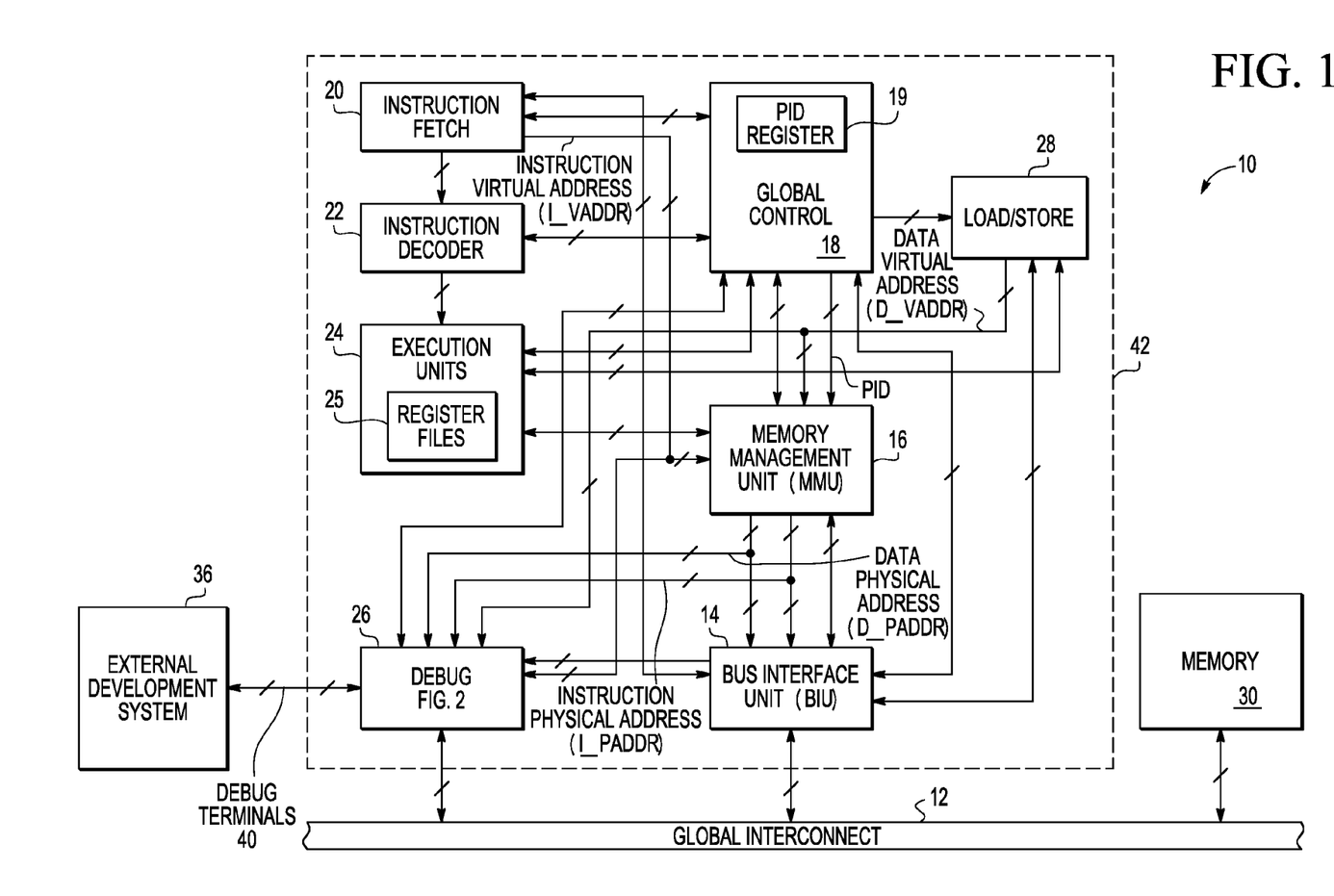
FIG. 1 illustrates, in block diagram form, a data processing system having debug message generation in accordance with an embodiment of the present disclosure.

Illustrated in FIG. 1 is an exemplary data processing system 10 that supports trace messaging during a debug mode of operation. Within data processing system 10 is a global interconnect 12. In one form global interconnect 12 is a system bus. Other forms of interconnect may be used including, for example, crossbars, point-to-point connections, and optical and wireless transmission techniques. In addition, there may be multiple other interconnects of the same or different type as interconnect 12 that are used in the same or similar manner as that described herein. A bus interface unit (BIU) 14 is connected to global interconnect 12 via a bidirectional interconnect. In one form the bidirectional interconnect is a bidirectional multiple conductor bus wherein multiple conductor buses herein are represented with a slash across the conductor. BIU 14 is bidirectionally connected to memory management unit (MMU) 16. MMU 16 is connected to a first input/output terminal of a global control module 18 via a bidirectional multiple conductor bus. A second input/output terminal of global control module 18 is connected to a first input/output terminal of an instruction fetch unit 20 via a bidirectional multiple conductor bus. Instruction fetch unit 20 has an output connected to an input of an instruction decoder 22 via a multiple conductor bus. An output of instruction decoder 22 is connected to an input of execution units 24. In one form, execution units 24 include at least one arithmetic logic unit, at least one floating point unit and at least one multiplier module. Within the execution units 24 are register files 25. An input/output terminal of instruction decoder 22 is connected to a third input/output terminal of the global control module 18. A first input/output terminal of execution units 24 is connected to a fourth input/output terminal of global control module 18. Execution units 24 and instruction fetch unit 20 are also bidirectionally connected to MMU 16. A load/store unit 28 has a first input/output terminal bidirectionally connected to a sixth input/output terminal of global control module 18. Load/store unit 28 has a second input/output terminal connected to a first input/output terminal of BIU 14. Load/store unit 28 has a third input/output terminal connected to a second input/output terminal of execution units 24. A second input/output terminal of BIU 14 is connected to a seventh input/output terminal of global control module 18. An output of load/store unit 28 provides a data virtual address (D_VADDR) and is connected to a first input of MMU 16 and a first input of debug module 26. An output of instruction fetch unit 20 provides an instruction virtual address (I_VADDR) and is connected to a second input of MMU 16 and a second input of debug module 26. A first output of MMU 16 provides a data physical address (D_PADDR) and is connected to a first input of BIU 14 and to a second input of debug module 26. A second output of MMU 16 provides an instruction physical address (I_PADDR) and is connected to a second input of BIU 14 and to a third input of debug module 26.

A memory 30 is connected to global interconnect 12 via a bidirectional interconnect. Debug module 26 has a second input/output terminal connected to a plurality of debug terminals 40 via bidirectional multiple conductors. The plurality of debug terminals 40 is connected to an external development system 36 that is an external debug tool commonly referred to as a debugger or external debugger, which reconstructs the program flow being executed by the system using various debug information and a local image of code memory contents. In the illustrated form BIU 14, MMU 16, global control module 18, instruction fetch unit 20, instruction decoder 22, execution units 24 with register files 25, debug module 26 and load/store unit 28 collectively form a data processor 42 as indicated by the dashed line grouping in FIG. 1. While various modules of FIG. 1, and other figures, are illustrated in a segregated locations with specific connections, it will be understood that such modules may also be implemented in a distributed manner and be included within any of the various other system blocks of data processing system 10. For example, the storage locations 71/72 illustrated at the debug module 26 embodiment of FIG. 2 can be part of the register files 25 or other portion of the data processor 42. Also, in the illustrated embodiment, global control 18 includes a process identifier (PID) register 19 that stores a process identifier (PID) for the currently executing process. Global control 18 also provides the PID to MMU 16.

In operation, data processor 42 can communicate with memory 30 and other devices (not shown) via global interconnect 12. Information communicated between memory 30 and other devices transfers through BIU 14. Instruction fetch unit 20 retrieves data processor instructions (i.e. processor instructions) from BIU 14 under control of global control module 18. The retrieved instructions are sequentially communicated to instruction decoder 22 for decoding under control of global control module 18. Execution units 24 execute instructions and generate data that is either stored in a cache (not shown) or placed in the memory 30 via global control module 18, BIU 14 and global interconnect 12. Debugging of the operation of data processor 42 and data processing system 10 is performed by the use of debug module 26 that generates debug information for analysis by external development system 36. A test or debug mode of operation is entered in response to activation of such from external development system 36.

In the illustrated form, debug module 26 is configured to receive address information from one or more of global interconnect 12 and from locations internal to data processor 42 including data virtual addresses, data physical addresses, program (instruction) virtual addresses, program physical addresses. Debug module 26 is configured to receive data information from BIU 14 and load/store unit 28, and information from global control 18. A data address is an address where data resides whereas a program address is an address where an instruction resides. Program virtual addresses are provided from instruction fetch unit 20 to the debug module 26 and MMU 16. A virtual address is an un-translated address which requires some further processing or translating to obtain a translated address of the physical storage location where the information is residing. MMU 16 provides instruction physical addresses to BIU 14 and debug module 26 by translating addresses of virtual pages of memory to corresponding physical page addresses. Pages of memory are contiguous locations which are grouped, and typically have a size that is a power of 2, such as for example a 4 Kbyte page, a 16 Kbyte page, a 64 Kbyte page, etc. Load/store unit 28 provides data virtual addresses to debug module 26 and to MMU 16. MMU 16 provides data physical addresses to BIU 14 and debug module 26. Debug module 26 forms a debug message for external development system 36 based upon information at one or more of the received addresses, as will be discussed in more detail below.

Figure 2:
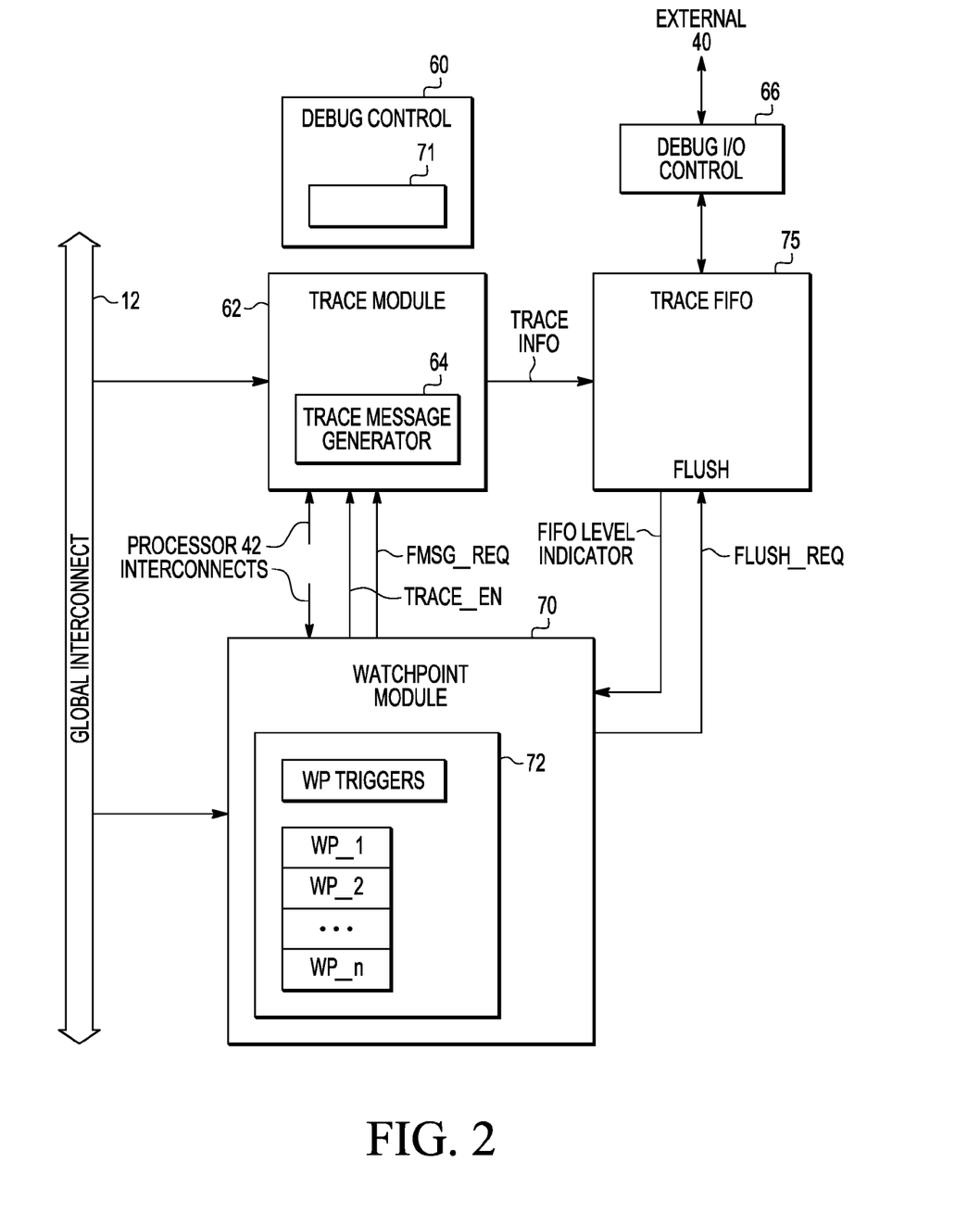
FIG. 2 illustrates, in block diagram form, a portion of a debug module of FIG. 1 in accordance with an embodiment of the present disclosure.

Illustrated in FIG. 2 is an exemplary embodiment of a portion of the debug module 26 of FIG. 1 that includes debug control module 60, trace module 62, watchpoint module 70, debug input/output (I/O) module 66, and trace FIFO 75. Debug control module 60 is used to control operation of the debug module 26, and can communicate with the various modules of FIG. 2. Trace module 62 monitors operation of the data processor 42, and in response to receiving a trace enable indicator (TRACE_EN) from the watchpoint module 70, will capture and provide trace information to FIFO 75, which stores the trace information in a next available storage location, which can be implemented at an array of storage locations (not illustrated). Watchpoint module 70 monitors operation of the system 10 for the occurrence of enabled watchpoint events, and notifies various portions of the debug module 26 in response to a watchpoint event being detected. While a watchpoint can be triggered by any one of a number of types of events, such as a particular address being accessed, a particular data value being stored, the like, and combinations thereof, for purposes of discussion, it is presumed a watchpoint is based upon a particular address being accessed. For example, the watchpoint module 70 can assert signal TRACE_EN, a trace enable indicator, to facilitate capturing trace information by the trace module 62. For purposes of discussion, various connections between portions of the debug module 26 and between global interconnect 12 are illustrated at FIG. 2 with arrows indicative of a particular direction of data flow with respect to an embodiment described herein. It will be appreciated, however, that the arrow indications are not intended to indicate a connection can only transmit information in a unidirectional manner.

Debug control module 60 includes a register 71 that can store information used to control various operational states of the debug control module 26. For example, register 71 can include a field DEBUG_EN that when asserted enables operation of the debug module 26, a field PGM_TRACE_EN that when asserted enables program trace messaging, a field DATA_TRACE_EN that when asserted enables data trace messaging, and the like. Debug control module 60 is connected (not shown) to the debug I/O control module 66. During operation, the debug control module 60 can receive external information via the debug I/O module 66 including commands that are executed by the debug control module 60. An example of a command that can be executed by the debug control module 60 includes commands that enable/disable debug operation, e.g., by writing to register 71.

Figure 3:
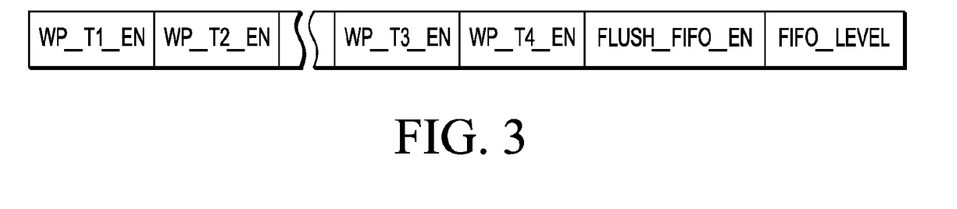
FIG. 3 illustrates, in block diagram form, storage locations used by a portion of the debug module of FIG. 2 in accordance with an embodiment of the present disclosure.

When enabled, trace module 62 monitors operations of the data processing system 10 based upon various debug control information. Specifically illustrated at FIG. 2 is a connection to global interconnect 12 that allows address and data at global interconnect 12 to be monitored, and a connection to interconnects internal to the data processor 42 so that information transmitted within processor 42 can be monitored. According to one embodiment, data trace messaging and program trace messaging by trace module 62 can be enabled by debug control module 60 directly in response to the debug control module 60 executing a command. According to another embodiment, data trace messaging and program trace messaging by trace module 62 are enabled/disabled by watchpoint module 70 in response to the occurrence of watchpoint events. For example, FIG. 3 illustrates a particular embodiment of a set of registers 72, labeled WP_TRIGGERS, that can be used to enable/disable trace messaging. The illustrated watchpoint trigger register includes watchpoint type enable fields labeled, WP_T1_EN; WP_T2_EN; WP_T3_EN; WP_T4_EN; and FLUSH_FIFO_EN. The illustrated watchpoint trigger register also includes the field FIFO_LEVEL, which, as will be described, may be used to further qualify the FIFO_FLUSH watchpoint type. Each of the watchpoint type enable fields of FIG. 3, correspond to different types of watchpoints which can trigger based upon different types of information, and cause the debug module to perform different operations, the like, and combinations thereof.

According to one embodiment, each of the watchpoint type enable register fields of FIG. 3 can be a multi-bit field, wherein one of the possible multi-bit values of a register field of FIG. 3 indicates that that register field's corresponding watchpoint type is disabled, and other possible multi-bit values of the register field identify corresponding watchpoint registers, respectively, that store values used to determine the occurrence of a watchpoint event of the corresponding watchpoint type. For example, each of the watchpoint type enable fields of FIG. 3 can be a three-bit field. A watchpoint enable field having a value of zero (000b) indicates that that field's corresponding watchpoint type is disabled; a binary value of one (001b) indicates that the field's corresponding watchpoint type is enabled and that watchpoint WP1 of the watchpoint module 70 is used to determine the occurrence of a watchpoint event; a value of two (010b) indicates that the watchpoint type corresponding to the field is enabled and that watchpoint WP2 of the watchpoint module is used to determine the occurrence of a watchpoint event; other watchpoints can be indicated for use in a similar manner.

Examples of different watchpoint types include: program trace enable watchpoints that enable program tracing by the trace module 62 in response to its watchpoint condition being met, such as in response to an executed address matching a value stored at an indicated watchpoint register; program trace disable watchpoints that disable program tracing by the trace module 62 in response to its watchpoint condition being met, such as in response to an executed address matching a value stored at an indicated watchpoint register; data trace enable watchpoints that enable data trace messaging by the trace module 62 in response to its watchpoint condition being met, such as in response to an executed address matching a value stored at an indicated watchpoint register; data trace disable watchpoints that disable data tracing by the trace module 62 in response to its watchpoint condition being met, such as in response to an executed address matching a value stored at an indicated watchpoint register; FIFO control watchpoints that result in change of operation of FIFO 75 in response to its watchpoint condition being met, such as in response to an executed address matching a value stored at an indicated watchpoint register; and the like. One type of FIFO control watchpoint is a FIFO flush watchpoint that may result in some or all of the data stored in FIFO 75 being flushed instead of being provided to the external development system 36, as will be discussed in greater detail below.

When enabled, the trace module 62 can acquire trace information from various locations, including: information from internal resources of the data processor 42, such as information from interconnects within processor 42; information at global interconnect 12; and the like. In response, the trace module 62 will have trace message generator 64 generate trace messages that are provided to the trace FIFO 75 for buffering prior to being provided to the external development system 36 (FIG. 1) for trace analysis. In particular, the debug I/O control module 66 can interface with trace FIFO 75 to access queued trace information, such as trace messages, to provide the messages via the external interconnect 40 to external development system 36.

Figure 4:
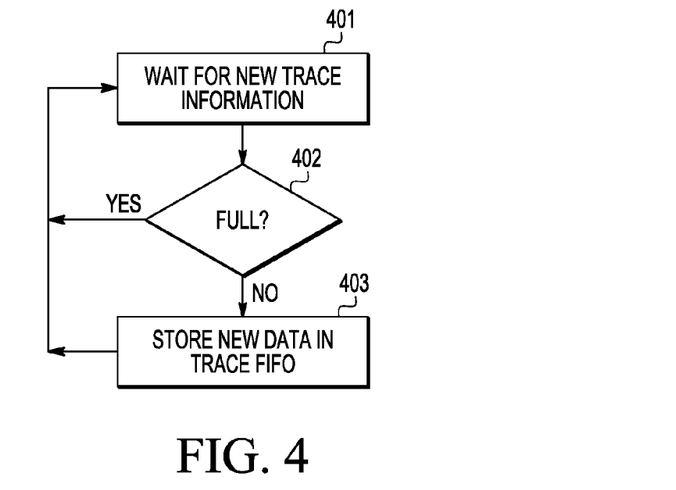
FIG. 4 illustrates, in flow diagram form, a particular method of operation of the trace FIFO of FIG. 2 in accordance with an embodiment of the present disclosure.

FIG. 4 illustrates, in flow diagram form, a method of a particular embodiment of operation of FIFO 75, wherein new trace data from trace module 62 is lost in response to response to FIFO 75 being full. The method of FIG. 4 waits at block 401 until new trace information is ready to be stored, e.g., at trace FIFO 75. In response to receiving the new trace information, flow proceeds to block 402, where it is determined whether trace FIFO 75 is full. If so, flow returns to block 401 to wait for additional new trace information, without storing the current new trace information at the FIFO 75; otherwise, flow proceeds to block 403. At block 403, the current new trace information is stored at the trace FIFO 75, and flow returns to block 401.

Figure 5:
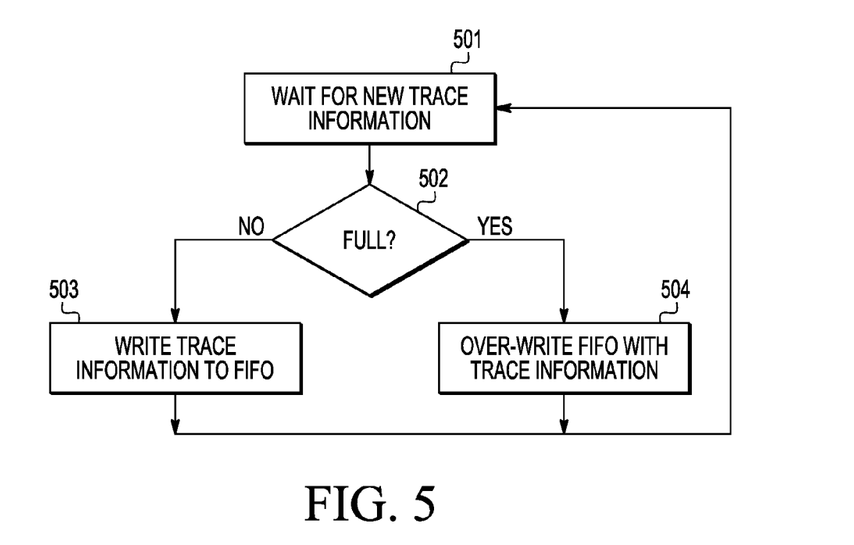
FIG. 5 illustrates, in flow diagram form, a particular method of operation of the trace FIFO of FIG. 2 in accordance with an embodiment of the present disclosure.

The method of FIG. 5 waits at block 501 until new trace information is ready to be stored, e.g., at trace FIFO 75. At block 502, it is determined whether the trace FIFO 75 is full. If trace FIFO 75 is not full, flow proceeds to block 503 where the new trace information is added to the trace FIFO 75 without affecting any other previously stored trace information; otherwise, in response to the FIFO 75 being full, flow proceeds to block 504 where the new trace information is stored at the trace FIFO 75 by flushing an existing FIFO entry containing previously stored debug information. For example, the oldest debug information can be flushed. It will be appreciated that the manner of operation of debug module 26 in response to FIFO 75 being full can also be handled in other manners. For example, the data processor 42 can be stalled in response to the FIFO 75 being full, thus preventing execution of further instructions until space is available at the FIFO 75.

In one embodiment, the debug module 26 supports one or more FIFO watchpoint types, including a FIFO flush watchpoint (FLUSH_FIFO) that may result in trace information queued at FIFO 75 being flushed and thereby preventing the flushed trace information from being communicated via external interconnect 40. As described above, a FIFO flush watchpoint event can occur in response to a watchpoint value stored at one or more of the watchpoint registers WP1-WPn matching the address at global interconnect 12. In one embodiment, a FIFO flush is performed in response to occurrence of a FIFO flush watchpoint event only if FIFO 75 has a particular fill level (i.e. has reached a specified fill level). For example, in the illustrated embodiment of FIG. 3, the FIFO_LEVEL register field provides the fill level required before a flush is performed in response to occurrence of a flush watchpoint event. In one embodiment, if FIFO_LEVEL has a value of 00b, then any fill level of the FIFO will result in a FIFO flush if a flush watchpoint event occurs. In this case, a FIFO flush will be performed in response to a FIFO flush watchpoint event, regardless of the current fill level of FIFO 75. However, if FIFO_LEVEL has a value of 01b, then upon occurrence of a flush watchpoint event, a flush will only occur if the FIFO is 25% or more full. Otherwise, a flush of the FIFO will not be performed upon occurrence of a flush watchpoint event. Similarly, if FIFO_LEVEL has a value of 10b, then upon occurrence of a FIFO flush watchpoint event, a flush will only occur if the FIFO is 50% or more full, and if FIFO_LEVEL has a value of 11b, then a flush will only occur if the FIFO is 75% or more full. Therefore, the FIFO_LEVEL can be used to provide a fill level of the FIFO that must exist in order for a flush to occur in response to occurrence of a FIFO flush watchpoint event. Furthermore, the fill level information of FIFO 75 can be provided by FIFO 75 to watchpoint module 70 by way of FIFO level indicator (which may also be referred to as a trace information level indicator). In alternate embodiments, more or fewer bits may be used for the FIFO_LEVEL field to represent the required FIFO fill level.

Upon the determination that a flush should occur in response to a flush watchpoint event, watchpoint module 70 can assert a FLUSH_FIFO indicator (such as, for example, FLUSH_REQ). Note that, in one embodiment, watchpoint module 70 may assert a watchpoint indicator upon occurrence of a flush watchpoint event, in which this indicator can be used in combination with the FIFO level indicator to determine if a flush should occur in response to the watchpoint event (e.g. to determine whether or not to assert the FLUSH_REQ). For purposes of discussion, it is presumed that a physical program address of global interconnect 12 is compared to the FLUSH_FIFO watchpoint to determine when a FLUSH_FIFO event occurs, though in other embodiments, the address can be associated with other busses or address types. Thus, in response to the occurrence of a FLUSH_FIFO event in which FIFO 75 is greater than or equal to a fill level as specified by FIFO_LEVEL, the watchpoint module 70 provides indicators notifying the trace FIFO 75 and the trace module 62 that a flush of FIFO 75 is to occur. For example, the watchpoint module 70 can assert signals FLUSH_REQ and FMSG_REQ, e.g., by driving predefined signal states at corresponding conductive nodes that are provided to the trace FIFO 75 and to the trace module 62, respectively, though it will be appreciated that other indicators can be used to communicate the need for a FIFO flush between the watchpoint module 70 and various other modules.

In response to the asserted FLUSH_REQ indicator, the trace FIFO 75 will be flushed; and in response to the asserted FMSG_REQ indicator, the trace module 62 generates a trace message that is stored in the flushed FIFO that indicates that the FIFO 75 has been flushed, thus invalidating any existing data. According to an embodiment, the entire contents of trace FIFO 75 will be flushed, as illustrated at FIG. 6.

Figure 6:
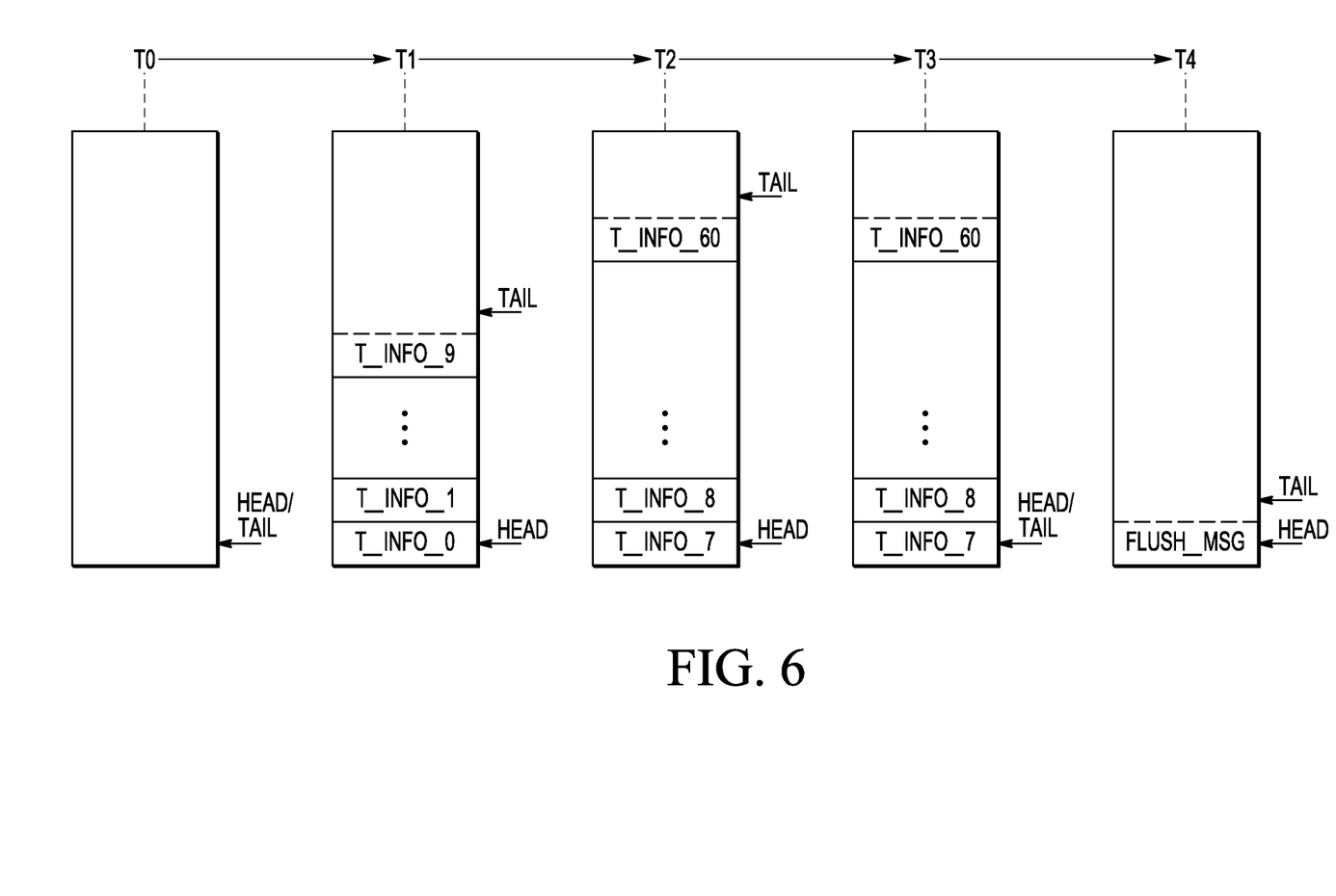
FIG. 6 illustrates, in block diagram form, trace information stored at the trace FIFO of FIG. 2 at various times in accordance with an embodiment of the present disclosure.

FIG. 6 illustrates, in block diagram form, the contents of FIFO 75 at various points of time. At time T0, no debug information has been stored at FIFO 75, which is therefore illustrated as empty, wherein the head pointer (H) and the tail pointer (T) of the FIFO are both pointing to a bottom-most entry of FIFO 75. After trace messaging is enabled, trace information T_INFO_0 through T_INFO_9 is stored at FIFO 75, where it remains until retrieved for communication to the external development system 36. Thus, at time T1 trace information T_INFO_0 through T_INFO_9 is stored at FIFO 75, the head pointer, which identifies the oldest FIFO entry, point to T_INFO_0, and the tail pointer of FIFO 75, which points to the FIFO location where the next trace information will be stored, points to the FIFO location after the location where T_INFO_9 is stored.

Between time T1 and time T2, trace information T_INFO_0 through T_INFO_6 is retrieved from the FIFO 75 and provided to the external development system 36, and new trace information T_INFO_10 through T_INFO_60 is stored at FIFO 75. This results the head of FIFO 75 pointing to information T_INFO_7, and the tail of FIFO 75 pointing to the FIFO location after the location where T_INFO_60 is stored.

Subsequent to time T2, the occurrence of a FLUSH_FIFO watchpoint event has occurred in which FIFO 75 had a fill level of at least the fill level required by FIFO_LEVEL, which results the entire contents FIFO 75 being flushed as indicated at time T3 of FIG. 6, wherein the head pointer and the tail pointer both point to the same location of FIFO 75. Note that for convenience of understanding, the information stored at FIFO 75 prior to being flushed is illustrated at time T3 to indicate which information has been flushed. In particular, information T_INFO_7 through T_INFO_60 has been flushed, and therefore will not be transmitted to the external development system 36.

In response to receiving the asserted FMSG_REQ indicator indicating the occurrence of the FIFO flush, the trace message generator 64 will generate trace information, labeled FLUSH_MSG in FIG. 6, that is stored in trace FIFO 75 at time T4 following the trace FIFO being flushed. The FLUSH_MSG indicates the occurrence of the FIFO flush in response to the FIFO flush watchpoint, which will allow the external development tool to determine that trace information has been lost, and therefore synchronize its operation once it receives the FLUSH_MSG. Note that flushing of the FIFO does not change the trace mode of operation, e.g., the debug module continues to store trace information in the FIFO 75 in the same manner after the FIFO is flushed as before the FIFO is flushed.

While the above described embodiment is described with respect to flushing a trace FIFO, it will be appreciated that additional types of FIFO control watchpoints can be implemented. For example, there may be a first type of FIFO control watchpoint, referred to as FLUSH_FIFO_1, that flushes a first FIFO that resides at debug module 42, and a second type of FIFO control watchpoint, referred to as FLUSH_FIFO_2, that flushes a second FIFO that resides external debug module 42. Each of the FIFO control watchpoints may have a corresponding FIFO_LEVEL which may be used to further qualify a corresponding watchpoint event to determine if a flush of the corresponding FIFO should occur in response to the watchpoint event based on the fill level of the FIFO.

Figure 7:
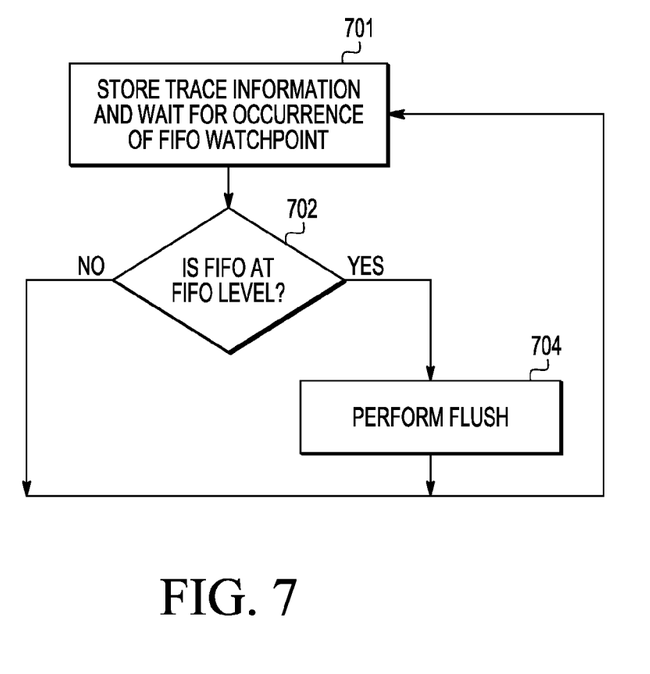
FIG. 7 illustrates, in flow diagram form, a particular method of operation of the debug module of FIG. 1 in accordance with an embodiment of the present disclosure.

FIG. 7 illustrates a particular method of operation of the debug module of FIG. 1 in accordance with an embodiment. The method begins at block 701 in which the debug module 26 is collecting trace information that is being stored at FIFO 75 in a normal manner while the watchpoint module 70 waits for the occurrence of a FIFO control watchpoint, e.g., a watchpoint that controls the manner in which the FIFO operates when debug messaging is enabled. Flow proceeds to decision diamond 702 in response to the occurrence of a FIFO control watchpoint event. If the FIFO is at least at the fill level as indicated by FIFO_LEVEL, then the method proceeds to block 704 in which the debug module implements a flush of the FIFO. If the FIFO is not at least at the fill level as indicated by FIFO_LEVEL, then the method proceeds from decision diamond 702 back to block 701, in which no flush is performed, even though a FIFO watchpoint event occurred.

Figure 8:
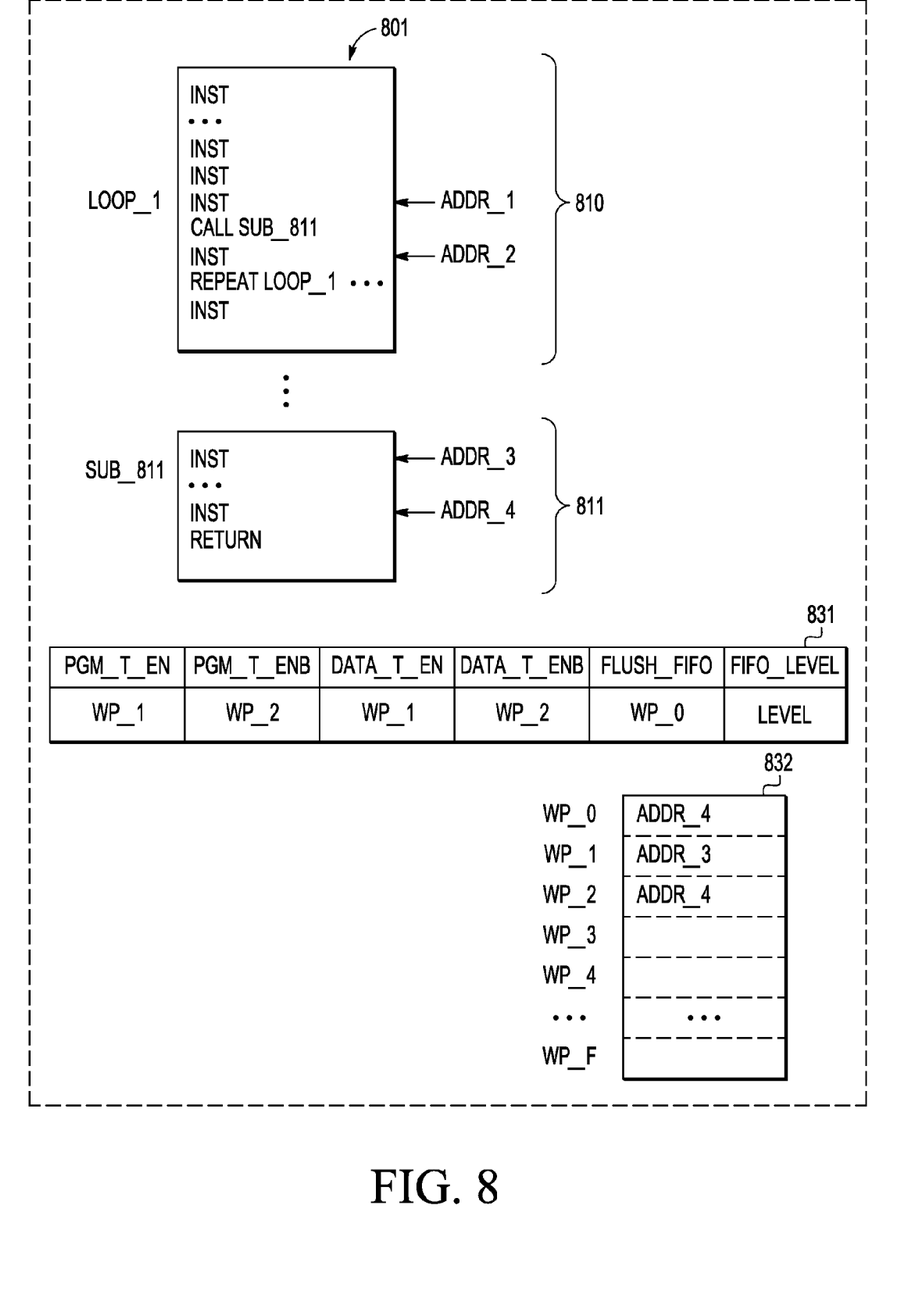
FIG. 8 illustrates a particular embodiment of program memory and debug register states for the system of FIG. 1.

FIG. 8 illustrates a block diagram a portion of the system 10, including a particular sequence of program code 801 that is being executed, a watchpoint trigger enable register 831, and watchpoint registers 832. The sequence of program code 801 includes a code portion 810 that includes a loop, labeled LOOP_1, that can be repeatedly executed in rapid succession in response to a repeat instruction that defines the end of the loop. A subroutine, labeled SUB_811, that resides at code portion 810 is executed each time LOOP_1 is executed.

The watchpoint trigger enable register 831 and watchpoint register 832 have been configured to perform program trace messaging and data trace messaging when executing the SUB_811, which begins at address ADDR_3 and ends at address location ADDR_4. In particular, a program trace enable watchpoint has been enabled by asserting field location PGM_T_EN of register 831 to a value corresponding to watchpoint WP_1 of watchpoint register 832. Since watchpoint WP_1 has been programmed with a value of ADDR_3, which is the location of the first instruction of subroutine SUB_811, program trace messaging will begin when execution of subroutine SUB_811 begins. Similarly, data trace messaging is enabled when execution of subroutine SUB_811 begins, by virtue of field location DATA_T_EN of register 831 also being asserted to the value corresponding to watchpoint WP_1. Program and data trace messaging are disabled when subroutine SUB_811 is exited, by virtue of field locations PGM_T_ENB and DATA_T_ENB of register 831 being asserted to a value corresponding to watchpoint WP_2, which stores an address value ADDR_4 that corresponds to the last instruction (ADDR_4) of subroutine SUB_811. Also, FIFO_LEVEL has been set to indicate a particular level, LEVEL. It is assumed that LEVEL provides a non-zero fill level that is required in the trace FIFO before a flush can be performed.

By enabling data and trace messaging when executing subroutine SUB_811, assuming no other watchpoints have been enabled, program and trace information will be stored at the trace FIFO of the debug module each time the subroutine SUB_811 is called. However, for problem code that is non-deterministic and executed many times before failure, such as code associated with subroutine SUB_811, it is very difficult to capture data around the silicon failure because the FIFOs are very likely to overflow due to the code being executed too many times, and at such a high rate, such that trace information is stored at the trace FIFO faster than it can be communicated to an external debug tool. The FLUSH_FIFO watchpoint can be used to address this problem. In particular, FIG. 8 illustrates that a FIFO flush watchpoint has been enabled by asserting field location FLUSH_FIFO of register 831 to a value corresponding to watchpoint WP_0. Since watchpoint WP_0 has been programmed with a value of ADDR_4, which is the location of the return command of subroutine SUB_811, a determination will be made upon returning from the subroutine as to whether or not the trace FIFO will be flushed, based on the current fill level of the trace FIFO. For example, if LEVEL indicates that a fill level of at least 50% is needed, then upon returning from the subroutine, at which a flush FIFO watchpoint event occurs, the FIFO level indicator from the trace FIFO will be compared to LEVEL to determine whether or not a flush will be performed. For example, using the example of LEVEL indicating 50%, then, upon returning from the subroutine, a flush of the trace FIFO will only occur if the trace FIFO is at least 50% full. Alternatively, this determination of whether or not to flush can be made just prior to calling the subroutine SUB_801. It will be appreciated that by providing the ability to clear the trace FIFO in this manner it can be ensured that there is storage space available for storing trace messages each time the subroutine SUB_811 is being executed.

It will be appreciated that while the present disclosure has been described with respect to a particular embodiment, many other embodiments may be apparent to those of skill in the art upon reviewing the disclosure.

In a first aspect, a method can include enabling a trace mode of operation of an integrated circuit, storing trace information at a memory of the integrated circuit in response to the trace mode of operation being enabled, and flushing the trace information from the memory in response to detecting an occurrence of a watchpoint if the memory is filled with the trace information to a specified level.

In one embodiment of the first aspect, the specified level is one of a group of different levels. In another embodiment, the method includes retaining the trace information in the memory if the memory is not filled with the trace information to the specified level. In another embodiment, the method includes generating a trace message at the integrated circuit that indicates the flushing of the memory, wherein the trace message is to be provided to an external interface of the integrated circuit. In yet another embodiment, the method includes generating a trace message that indicates the occurrence of the watchpoint, wherein the trace message is to be provided to an external interface of the integrated circuit.

In a particular embodiment of the first aspect, new trace information is not stored at the memory during the trace mode of operation in response to the memory being full. In a more particular embodiment, the method includes enabling the trace mode is in response to detecting occurrence of a watchpoint of a second type. In still another particular embodiment, the method includes receiving a command at an external interface of the integrated circuit, and enabling the trace mode in response to executing the command. In an even more particular embodiment, flushing the trace information from the memory in response to detecting the occurrence of a watchpoint includes asserting a memory flush indicator. In a further embodiment, the occurrence of the watchpoint is detected in response to an address of an access matching the watchpoint.

In a second aspect, a device can include a debug trace module coupled to provide trace information of a data processor to a memory module, a watchpoint module to provide a flush indicator in response to detecting an occurrence of a watchpoint event, and the memory module coupled to provide a trace information level indicator to the watchpoint module, the memory module to flush the trace information stored at the memory module in response to the flush indicator and the trace information indicator being greater than or equal to a specified level.

In one embodiment of the first aspect, the memory is a first-in first-out memory. In another embodiment, the trace module is coupled to the watchpoint module, and is to generate a trace message indicative of the flush indicator being provided. In still another embodiment, the trace message indicative of the flush indicator being provided is to be stored at the memory module subsequent to the buffered trace information being flushed. In yet another embodiment, the memory module is not to store new trace information in response to the memory being full.

In a further embodiment of the second aspect, the watchpoint event is a first watchpoint event of a first type, and the watchpoint module to provide a trace enable indicator at the output in response to detecting an occurrence of a second watchpoint event of a second type, and the trace module is enabled to provide the trace information in response to the trace enable indicator. In an even further embodiment, the specified level is one of a group of different levels.

In a third aspect, a method can include enabling detection of a trace FIFO control watchpoint event, wherein the trace FIFO control watchpoint is to modify operation of a FIFO (First-in First-out) memory that stores trace information of a data processor's operation, in response to detecting an occurrence of the trace FIFO control watchpoint, modifying an operating condition of the FIFO from a first operating condition to a second operating condition if a level indicator of the trace information in the FIFO memory is greater than a specified level, wherein the FIFO memory is enabled to store trace information during both the first and second operating conditions.

In one embodiment of the third aspect, the second operating condition varies from the first operating condition in that the trace information stored at the FIFO has been flushed. In another embodiment, the method includes generating trace information indicative of the modification of the operating condition of the FIFO. In yet another embodiment, the trace information is stored at the FIFO.

In addition, other embodiments may be used or derived from the disclosure, such that a structural substitution, logical substitution, or another change may be made without departing from the scope of the disclosure. Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    enabling a debug trace mode of operation of an integrated circuit;
    storing first trace information at a memory of the integrated circuit in response to the debug trace mode of operation being enabled; and
    in response to a flush request signal, responsive to detecting an occurrence of a watchpoint, flushing the first trace information from the memory to prevent the first trace information from being provided for trace analysis if the memory is filled with the trace information to a specified fill level, wherein detecting the occurrence of the watchpoint occurs after storing of the first trace information.

2. The method of claim 1, wherein the specified level is one of a group of different levels.

3. The method of claim 1 further comprising:
    retaining the trace information in the memory if the memory is not filled with the trace information to the specified level.

4. The method of claim 1 further comprising:
    generating a trace message that indicates the occurrence of the watchpoint.

5. The method of claim 1, wherein new trace information is not stored at the memory during the debug trace mode of operation in response to the memory being full.

6. The method of claim 1 further comprising:
    enabling the trace mode is in response to detecting occurrence of a watchpoint of a first type or a second type.

7. The method of claim 1 further comprising: receiving a command at an interface of the integrated circuit, and enabling the trace mode in response to executing the command.

8. The method of claim 1, wherein flushing the trace information from the memory in response to detecting the occurrence of a watchpoint includes asserting a memory flush indicator.

9. The method of claim 1, wherein the occurrence of the watchpoint is detected in response to an address of an access matching an address associated with the watchpoint.

10. A device comprising:
    an integrated circuit comprising a debug trace module, the debug trace module coupled to provide trace information of a data processor to a memory module;
    a watchpoint module to provide a flush request indicator in response to detecting an occurrence of a watchpoint event; and
    the memory module coupled to provide a trace information level indicator to the watchpoint module, the memory module to flush the trace information stored at the memory module so that the trace information is prevented from being provided for trace analysis in response to the flush request indicator and the trace information level indicator being greater than or equal to a specified fill level.

11. The device of claim 10, wherein the memory module is a first-in first-out memory.

12. The device of claim 10, wherein the trace module is coupled to the watchpoint module, and generates a trace message indicative of the flush indicator being provided.

13. The device of claim 10, wherein the trace message indicative of the flush indicator being provided is to be stored at the memory module subsequent to the buffered trace information being flushed.

14. The device of claim 10, wherein the memory module does not store new trace information in response to the memory being full.

15. The device of claim 10, wherein the watchpoint event is a first watchpoint event of a first type, and the watchpoint module to provide a trace enable indicator at the output in response to detecting an occurrence of a second watchpoint event of a second type, and the trace module is enabled to provide the trace information for trace analysis in response to the trace enable indicator.

16. The method of claim 10, wherein the specified level is one of a group of different levels.

17. A method comprising:
enabling detection of a trace FIFO control watchpoint event, wherein a trace FIFO control watchpoint is to modify operation of a FIFO (First-in First-out) memory that stores trace information of a data processor's operation;

in response to detecting an occurrence of the trace FIFO control watchpoint, modifying an operating condition of the FIFO from a first operating condition to a second operating condition if a level indicator of trace information in the FIFO memory is greater than a specified fill level, wherein the second operating condition varies from the first operating condition in that trace information in the FIFO memory during the first operating condition has been flushed, in response to a flush request signal based upon the occurrence of the trace FIFO control watchpoint, to prevent the trace information from being provided for trace analysis at the second operating condition, and the FIFO memory is enabled to store additional trace information during both the first and second operating conditions.

18. The method of claim 17 further comprising: generating trace information indicative of the modification of the operating condition of the FIFO.

19. The method of claim 18, wherein the trace information is stored at the FIFO.

* * * * *